United States Patent
Rajappa et al.

(10) Patent No.: US 9,734,470 B2
(45) Date of Patent: Aug. 15, 2017

(54) APPARATUS AND METHOD FOR PROVIDING CUSTOMIZED VIEWING AND CONTROL OF FIELD DEVICES THROUGH CUSTOM GROUPS AND ACTIONS IN A PROCESS CONTROL SYSTEM

(71) Applicant: Honeywell International Inc., Morristown, NJ (US)

(72) Inventors: Shankar Rajappa, Andhra Pradesh (IN); Subha Lalitha Bhattiprolu, Madeenaguda (IN); Suresh Kumar Palle, Andhra Pradesh (IN)

(73) Assignee: Honeywell International Inc., Morris Plains, NJ (US)

( * ) Notice: Subject to any disclaimer, the term of this patent is extended or adjusted under 35 U.S.C. 154(b) by 114 days.

(21) Appl. No.: 14/080,369

(22) Filed: Nov. 14, 2013

(65) Prior Publication Data
US 2015/0135117 A1    May 14, 2015

(51) Int. Cl.
G06Q 10/06    (2012.01)
G05B 19/418    (2006.01)

(52) U.S. Cl.
CPC ......... *G06Q 10/06* (2013.01); *G05B 19/4183* (2013.01); *G05B 2219/25428* (2013.01); *G05B 2219/31472* (2013.01); *Y02P 90/10* (2015.11)

(58) Field of Classification Search
CPC ........... G05B 2219/31474; G05B 2219/25428; G05B 23/0283; G05B 19/4183;
(Continued)

(56) References Cited

U.S. PATENT DOCUMENTS 5,903,455 A    5/1999    Sharpe, Jr. et al.
5,960,214 A    9/1999    Sharpe, Jr. et al.
(Continued)

FOREIGN PATENT DOCUMENTS

EP    0 962 845 A2    12/1999

OTHER PUBLICATIONS

K. Thramboulidis, "Development of Distributed Industrial Control Applications: The CORFU Framework", 4th IEEE International Workshop on Factory Communication Systems, Vasteras, Sweden, Aug. 28-30, 2002, p. 1-8.
(Continued)

*Primary Examiner* — William Bashore
*Assistant Examiner* — Daniel Parcher

(57) ABSTRACT

A method includes generating a graphical display associated with an industrial process control system having multiple field devices. The graphical display includes a custom group of field devices, where the custom group includes a user-defined subset of the field devices. The method also includes presenting the graphical display. The method further includes receiving a request to perform an action associated with the custom group. In addition, the method includes initiating performance of the action for each field device in the custom group. The action could include a user-defined custom action, and the method could further include defining the custom action based on user input. The graphical display could include multiple custom groups of field devices and, for each custom group, identify a status of each field device in the custom group. Each custom group could identify critical field devices associated with a different functional unit in an industrial facility.

23 Claims, 6 Drawing Sheets

(58) Field of Classification Search
CPC .............. Y02P 90/10; B60H 1/00021; B60H 2001/225; H05B 6/6461; G06Q 10/06
See application file for complete search history.

(56) References Cited

U.S. PATENT DOCUMENTS

| | | | |
|---|---|---|---|
| 5,980,078 A * | 11/1999 | Krivoshein et al. ............. 700/1 |
| 6,094,600 A | 7/2000 | Sharpe, Jr. et al. |
| 6,775,576 B2 * | 8/2004 | Spriggs et al. .................. 700/8 |
| 7,054,695 B2 | 5/2006 | Opheim et al. |
| 7,266,777 B2 | 9/2007 | Scott et al. |
| 8,060,630 B1 * | 11/2011 | Jancaitis et al. ............. 709/229 |
| 8,130,677 B2 | 3/2012 | Barker et al. |
| 8,201,077 B2 | 6/2012 | Reddy et al. |
| 8,214,752 B2 | 7/2012 | Ferlitsch |
| 8,555,190 B2 | 10/2013 | Anne et al. |
| 8,729,834 B1 * | 5/2014 | Funderburk et al. ......... 315/312 |
| 8,838,282 B1 * | 9/2014 | Ratliff et al. ................. 700/295 |
| 2003/0028418 A1 * | 2/2003 | Yamaguchi ............ G06Q 10/06 702/81 |
| 2004/0117330 A1 * | 6/2004 | Ehlers et al. ................. 705/412 |
| 2005/0012608 A1 * | 1/2005 | Havekost ........... G05B 23/0272 340/517 |
| 2005/0164684 A1 | 7/2005 | Chen et al. |
| 2005/0222698 A1 * | 10/2005 | Eryurek et al. ................ 700/90 |
| 2007/0005266 A1 * | 1/2007 | Blevins ................ G05B 17/02 702/22 |
| 2007/0077665 A1 | 4/2007 | Bump et al. |
| 2007/0078540 A1 | 4/2007 | Bump et al. |
| 2007/0079250 A1 | 4/2007 | Bump et al. |
| 2007/0132779 A1 | 6/2007 | Gilbert et al. |
| 2007/0185754 A1 * | 8/2007 | Schmidt ................. G06Q 10/06 705/7.13 |
| 2008/0288321 A1 * | 11/2008 | Dillon ................ G05B 23/0283 705/7.13 |
| 2008/0301703 A1 | 12/2008 | Nixon et al. |
| 2009/0064038 A1 | 3/2009 | Fleischman et al. |
| 2009/0271726 A1 | 10/2009 | Gavimath et al. |
| 2010/0070255 A1 * | 3/2010 | Biltz ..................... G06F 11/261 703/13 |
| 2011/0022978 A1 | 1/2011 | Keller |
| 2011/0022979 A1 | 1/2011 | Meier et al. |
| 2011/0060994 A1 | 3/2011 | Maxwell et al. |
| 2013/0041852 A1 * | 2/2013 | Ellis et al. ..................... 705/412 |
| 2013/0107313 A1 * | 5/2013 | Kirby .................... G06F 3/1203 358/1.15 |
| 2013/0173621 A1 * | 7/2013 | Kapoor ............. G06F 17/30707 707/737 |
| 2014/0257526 A1 * | 9/2014 | Tiwari ................... G05B 13/02 700/29 |
| 2015/0032278 A1 * | 1/2015 | Bhageria ............. H02J 13/0017 700/295 |
| 2015/0094871 A1 * | 4/2015 | Bhageria ................... H02J 3/00 700/297 |

OTHER PUBLICATIONS

"What is a Device Description", Romilly Bowden 1999, www.romilly.co.uk/whatdd.htm, 4 pages.
"Digital fieldbus installations use EDDL for simplicity with advanced, full functionality", IEE Computing & Control Engineering, Dec./Jan. 2004/2005, p. 24-31.
"EDDL Overview", ISA, Apr. 16, 2007, 69 pages.
Notification of Transmittal of the International Search Report and the Written Opinion of the International Searching Authority, or the Declaration dated Jan. 2, 2012 in connection with International Patent Application No. PCT/US2011/041936.
"OneWireless, Wireless Device Manager, User's Guide", Honeywell Process Solutions, May 2011, 154 pages.

* cited by examiner

APPARATUS AND METHOD FOR PROVIDING CUSTOMIZED VIEWING AND CONTROL OF FIELD DEVICES THROUGH CUSTOM GROUPS AND ACTIONS IN A PROCESS CONTROL SYSTEM

TECHNICAL FIELD

This disclosure relates generally to process control systems. More specifically, this disclosure relates to an apparatus and method for providing customized viewing and control of field devices through custom groups and actions in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Graphical user interfaces are provided on operator stations in control rooms or other locations to facilitate interaction with the field devices. As a particular example, asset management systems typically include applications providing graphical user interfaces that allow operators to select different field devices and perform configuration or other operations involving the field devices.

SUMMARY

This disclosure provides an apparatus and method for providing customized viewing and control of field devices through custom groups and actions in a process control system.

In a first embodiment, a method includes generating a graphical display associated with an industrial process control system having multiple field devices. The graphical display includes a custom group of field devices, where the custom group includes a user-defined subset of the field devices. The method also includes presenting the graphical display. The method further includes receiving a request to perform an action associated with the custom group. In addition, the method includes initiating performance of the action for at least some of the field devices in the custom group.

In a second embodiment, an apparatus includes at least one memory configured to store an identification of a custom group of field devices. The custom group includes a user-defined subset of field devices in an industrial process control system. The apparatus also includes at least one processing device configured to generate a graphical display for presentation, where the graphical display includes the custom group of field devices. The at least one processing device is also configured to receive a request to perform an action associated with the custom group and initiate performance of the action for at least some of the field devices in the custom group.

In a third embodiment, a non-transitory computer readable medium embodies a computer program. The computer program includes computer readable program code for generating a graphical display associated with an industrial process control system having multiple field devices. The graphical display includes a custom group of field devices, and the custom group includes a user-defined subset of the field devices. The computer program also includes computer readable program code for presenting the graphical display, receiving a request to perform an action associated with the custom group, and initiating performance of the action for at least some of the field devices in the custom group.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
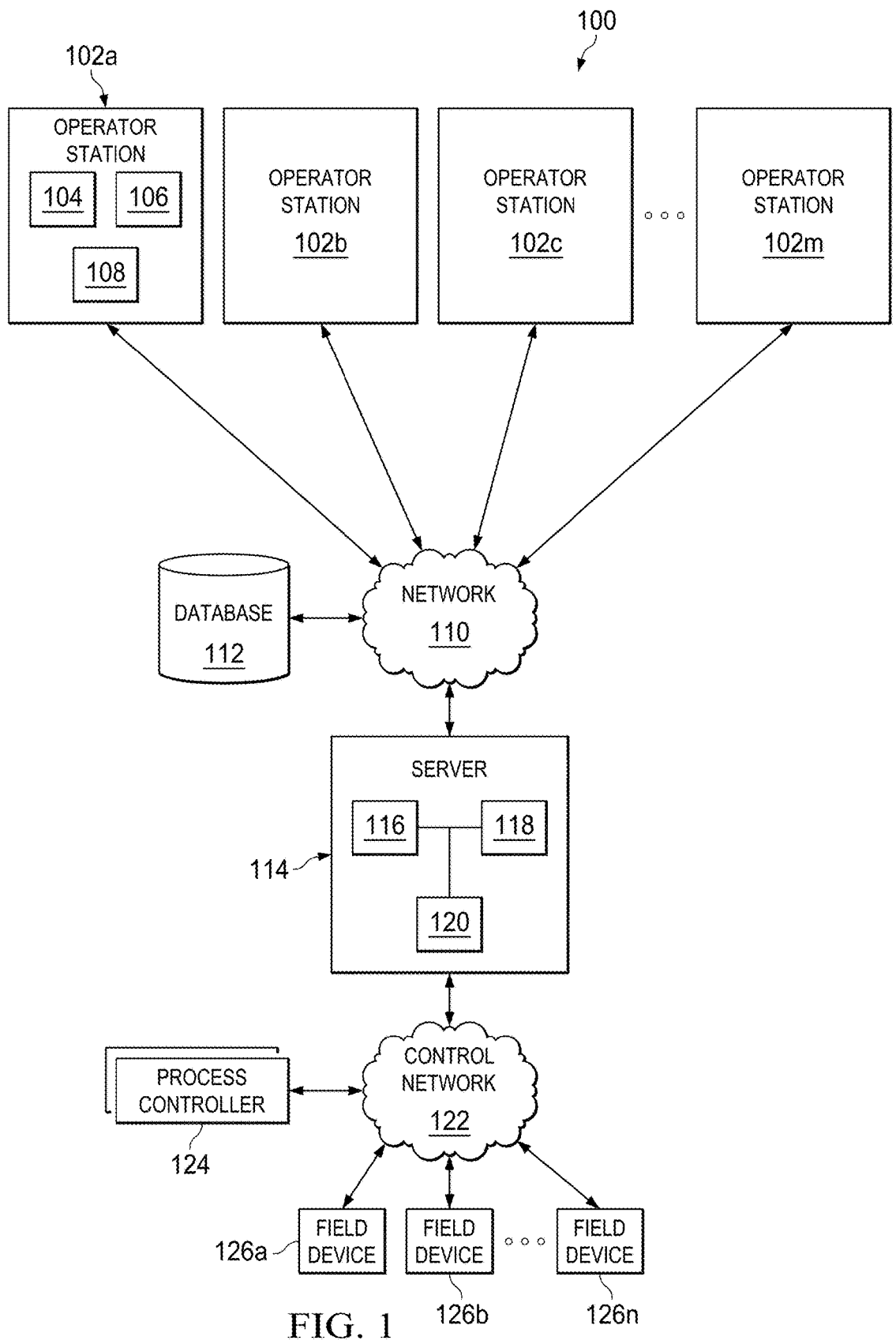
FIG. 1 illustrates an example process control system according to this disclosure.

FIG. 1 illustrates an example process control system 100 according to this disclosure. As shown in FIG. 1, the system 100 includes multiple operator stations 102a-102m, which provide users with the capability of managing or otherwise interacting with various other devices. The operator stations 102a-102m could also provide various other capabilities, such as allowing users to configure or review process control strategies. As a particular example, the operator stations 102a-102m could display user interfaces that personnel can use to interact with and manage field devices 126a-126n. A user interface could display various screens to a user, receive user inputs, and provide responses.

Each operator station 102a-102m includes any suitable structure, such as a computing device, for supporting user access or control of one or more devices. In particular embodiments, each operator station 102a-102m includes one or more processing devices 104, such as at least one microprocessor, microcontroller, digital signal processor (DSP), field programmable gate array (FPGA), application specific integrated circuit (ASIC), or discreet device. Each operator station 102a-102m also includes one or more memories 106 storing instructions and data used, generated, or collected by the processing device(s) 104. Each operator station 102a-102m further includes one or more network interfaces 108 supporting communication over at least one network, such as one or more Ethernet interfaces or wireless radio frequency (RF) transceivers. Note that an operation station could be a fixed device (such as a desktop computer) or a portable device (such as a laptop or tablet computer).

A network 110 facilitates communication between various components of the system 100, such as between the operator stations 102a-102m, a database 112, and a server 114. The network 110 includes any suitable structure(s) for facilitating communications between networked components. The network 110 could also support any suitable communication protocols or technologies, such as Ethernet, ATM, or TCP/IP.

The database 112 provides a repository for various information, such as information related to various devices in the system 100. For example, the database 112 could store configuration information or maintenance schedules related to the field devices 126a-126n. At least some of the stored information can be retrieved and displayed on the operator stations 102a-102m to users. The database 112 could represent a central repository for the control system 100, a repository for specific information or specific applications (like an asset management application), or any other suitable data store. The database 112 includes any suitable structure supporting the storage and retrieval of information. Also, there could be any number of databases 112 at any number of physical locations.

The server 114 supports various functions, depending on the implementation of the system 100. For example, the server 114 can help to retrieve information from the database 112 and provide the retrieved information to the operator stations 102a-102m. The server 114 can also interface with process control components to control an industrial process based on user input from the operator stations 102a-102m. The server 114 includes any suitable computing device for executing one or more functions. In particular embodiments, the server 114 includes one or more processing devices 116, one or more memories 118 storing instructions and data used, generated, or collected by the processing device(s), and one or more network interfaces 120 supporting communication over at least one network.

A control network 122 couples the server 114 and at least one process controller 124 with various field devices 126a-126n. The control network 122 includes any suitable structure for facilitating communications to and from process control components. For example, the control network 122 may contain various network devices (such as multiplexors, modems, or termination panels) operating according to one or more protocols (such as HART, FOUNDATION Fieldbus, or Control Net).

The process controller 124 can issue commands to control the operation of at least some of the field devices 126a-126n in order to implement a desired control strategy in the industrial environment being controlled. The desired control strategies could be programmed by the server 114 using control strategies that are specified in the database 112 based on inputs received from operator stations 102a-102m. The process controller 124 may receive various status information from at least some of the field devices 126a-126n, which are used in various decision points (such as IF conditions) within a control strategy. The process controller 124 includes any suitable structure for implementing one or more control strategies.

The field devices 126a-126n can implement a wide variety of functions in a process control system to monitor or control an industrial process. For example, the field devices 126a-126n could represent sensors measuring various process variables (such as temperature or pressure sensors). The field devices 126a-126n could also represent actuators for altering operation of an industrial process (such as valves). The field devices 126a-126n could further represent relays, process controllers, input/output (I/O modules), or any other devices that perform various operations.

In one aspect of operation, the operator stations 102a-102m, the server 114, or other device(s) in system 100 could execute a wide range of applications supporting the interaction with, management of, or control over the system 100. Any number of these applications can include graphical user interfaces to facilitate interactions with users. For example, an asset management application could generate a graphical user interface that allows users to select different field devices 126a-126n and perform configuration operations or other operations involving the field devices 126a-126n.

In many conventional asset management applications and other applications, a fixed hierarchy is used to identify field devices in a graphical user interface. For example, field devices are often arranged either according to a network hierarchy or according to a plant segregation defined by engineers in an enterprise/plant model. There is no easy way for a user to see only those field devices that are deemed "critical" based on plant operations policy, a maintenance operator's work schedule, or other criteria.

Consider a plant engineer that uses a graphical user interface during a normal plant operation (running) phase. In many conventional graphical user interfaces, the plant engineer can only view field devices based on their network arrangement (network hierarchy view) or based on the enterprise/plant model (plant view). The plant engineer might be able to narrow the list of displayed field devices based on some user-defined set of conditions, such as by searching for specific device types, manufacturer/vendor types, device status, device protocol, or a combination of such attributes. A typical industrial plant could easily include hundreds or thousands of field devices, making it extremely difficult for the plant engineer or other operator to locate appropriate field devices in a display.

Not only that, many asset management applications support only an enterprise model-based segregation of field devices. Typically, this model is defined primarily during the project-engineering phase of an industrial plant, which occurs before the plant becomes operational. There are typically no flexible options after that point for a plant engineer or other personnel to modify the model extensively in order to view specific devices deemed critical during the plant operation phase. While a display filter might be available, the filter is typically based on some set of pre-defined conditions. Those predefined conditions cannot always be applied to create custom groupings of field devices that can be extended or modified to support functions such as daily maintenance activities.

In accordance with this disclosure, the system 100 supports at least one graphical user interface that allows a user to create one or more custom groups and to associate critical or other field devices with the custom group(s). For example, a plant engineer or other user could create custom groups like "Boiler Unit," "Distillation Unit," and other groups associated with specific functional units within an industrial facility. The user could then associate the field devices in those functional units with the custom groups. As another example, a maintenance engineer or other user could create custom groups like "Morning Shift-A" or "Evening Shift-B" groups, where the field devices in those groups are to be examined and serviced by maintenance personnel during a given work shift. This supports custom segregation based on a facility's maintenance operation model. These represent two simple examples of the types of custom groups of field devices that can be created by users.

Once a custom group is defined, a user can view information about the field devices in the custom group in a graphical user interface (either the same interface used to define the group or a different interface). For example, the user could observe the status of or otherwise monitor all of the field devices in a custom group simply by selecting the custom group. The user is not required to enter complex search conditions or locate the different field devices in a long list of all field devices.

The custom groups can also be used to initiate various actions, including custom actions that may not be needed for other sets of field devices (like non-critical field devices or non-grouped field devices). Functions provided by applications executed in the system 100 or by other components of the system 100 could be triggered for at least some of the field devices in a custom group based on the selected action. The selected action can be performed for each field device in the custom group or a subset of these field devices, without requiring the user to select the action for each individual field device. One example of a custom action includes the definition of a higher frequency for health monitoring, such as when the health of field devices in the group is checked more often than for other field devices. Another example of a custom action includes enforcing strict data collection policies for maintenance reports on labor/efforts going towards maintaining field devices in the group. This provides flexibility by allowing users to define custom actions that enable the system to capture maintenance efforts, device alerts, and other information. As a general rule, custom actions may often represent actions that need not be performed on non-critical devices in an industrial plant (although this need not be the case).

For each custom action, a user can define the custom action and define the rules, logic, or one or more other functions to be executed in order to implement the custom action. This information can be collected and stored at an operator station for local use. The information can also be collected and stored in a historian or other database 112 so that the custom action can be used by the same user or by other users on different operator stations. The information can also be used by other applications.

In addition, a graphical user interface could allow a user to generate one or more reports associated with custom groups of field devices. The reports could involve any suitable aspects of the grouped field devices, such as operational and maintenance aspects. The one or more reports could be generated using one or more custom actions.

This mechanism for creating custom groups of field devices and performing custom actions for the groups of field devices can provide various benefits depending on the implementation. For example, as noted above, conventional applications may allow a user to filter a listing of field devices based on predefined conditions. However, there could be instances where a user might want to group field devices that have no matching conditions (such as no common attributes). This could occur, for instance, when a user is working with devices in critical control loops or with field devices that are not co-located. This approach allows a user to group any suitable field devices together, regardless of whether the field devices share common attributes. Moreover, as noted above, an industrial plant could contain hundreds or thousands of field devices. Different devices may be critical at different times of day, and conventional systems offer no easy way for a user to define custom actions to be performed on critical devices. The approach here allows the definition of groups of field devices that may be critical at different times, and the approach easily applies custom actions to groups of field devices. This may support various functions, such as the consistent collection of device metrics by different users to support maintenance operations. In addition, this approach supports detailed reporting capabilities for custom groups and custom actions to support further analysis or other functions. As a particular example, the reports could be used to support detailed analyses that help with decision-making, maintenance schedule tracking, and audits. It also helps users to capture the availability and quality of critical field devices or other field devices in the system 100 and supports proactive maintenance in the system 100.

Additional details regarding the creation and use of custom field device groups and custom actions are provided below. Note that this functionality could be supported by one or multiple applications in the system 100. While sometimes described as being used in an asset management application, this functionality could be used in any other suitable application, such as any monitoring, configuration, or maintenance application.

Although FIG. 1 illustrates one example of a process control system 100, various changes may be made to FIG. 1. For example, the process control system 100 could include any number of field devices, networks, servers, databases, operator stations, and control system components. Also, the makeup and arrangement of the system 100 is for illustration only. Various components in FIG. 1 could be combined, further subdivided, or omitted and additional components could be added according to particular needs. In addition, FIG. 1 illustrates one example operational environment in which user-defined custom field device groups and custom actions can be used. This functionality could be used in any other suitable system. As a particular example, any system that provides user access to field devices could support this functionality, such as a cloud-based implementation or other implementation having multiple networks between the operator stations and the field devices.

Figure 3:
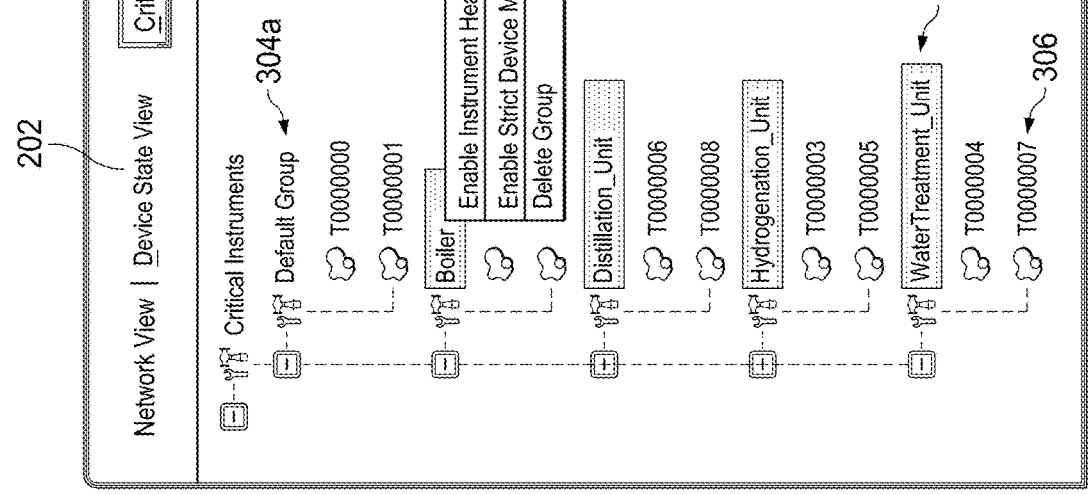
FIGS. 2 and 3 illustrate an example graphical user interface supporting customized viewing and control of field devices according to this disclosure.
Figure 2:
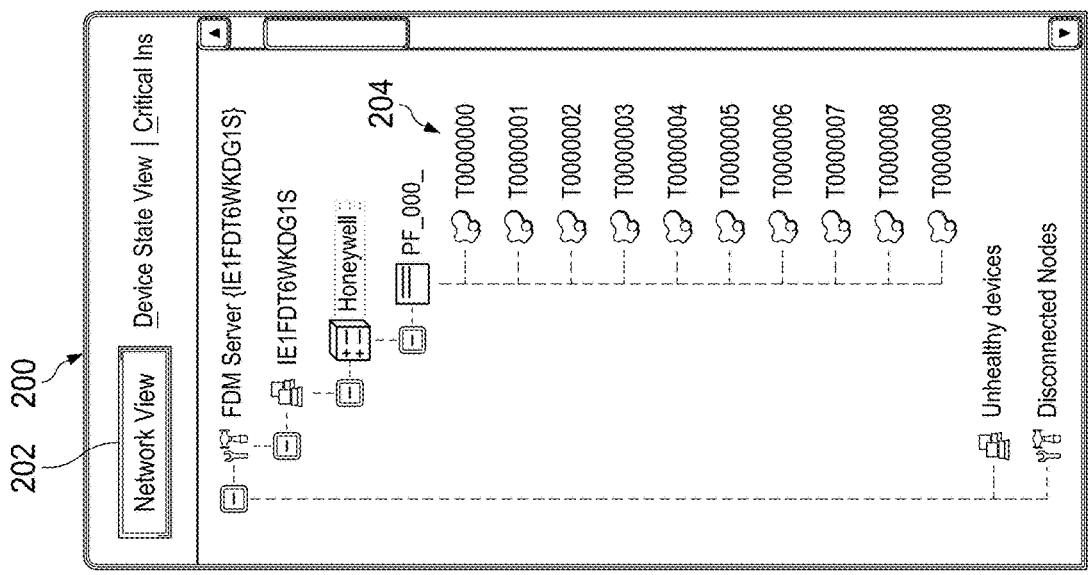

FIGS. 2 and 3 illustrate an example graphical user interface 200 supporting customized viewing and control of field devices according to this disclosure. As shown in FIG. 2, the graphical user interface 200 includes a view selector 202 and a device display 204. The view selector 202 allows a user to select different types of organizations for displaying field devices in the device display 204. The device display 204 presents a listing of field devices organized based on the selected type of view from the view selector 202.

In this example, the types of views include a network view and a device state view. The network view is selected here, and the field devices are arranged in the device display 204 based on their arrangement in a network. The device state view could also be selected, in which case the field devices are arranged in the device display 204 based on common operational states of the field devices.

The view selector 202 also allows a user to select a "Critical Instruments" view, which is selected in FIG. 3. This presents a device display 302 to the user in which one or more custom groups 304a-304n each identifies one or more field devices 306 associated with that group. The device display 302 could support any number of custom groups, and each custom group could include any number of field devices. The custom groups 304a-304n shown here could include a small subset of the total number of field devices in a process control system. By allowing the creation of these custom groups, a user is able to quickly view a listing of critical or other field devices in logical collections or groupings. As a result, the user is able to quickly locate, view, and if necessary adjust operation of various field devices.

Note that each field device 306 listed in the custom groups 304a-304n has an associated icon on the left of its name.

This icon can be used to convey information to a user. For example, the color or shape of an icon could convey information about the associated field device's health or operational status. This may allow, for instance, a user to quickly scan the custom groups 304a-304n to identify the current status of critical field devices.

As shown in FIG. 3, a user is also able to trigger the performance of one or more custom actions for each custom group 304a-304n. For example, the user could "right-click" or otherwise select a custom group 304a-304n in order to view a pop-up window 308 listing the possible custom actions that can be selected. In this example, the pop-up window 308 allows the user to enable an instrument health assessment, enable strict device maintenance actions, and delete a custom group. Note, however, that any other or additional custom action(s) could be included in the pop-up window 308. The list of custom actions could be provided by the system or be created by the user as and when needed. Other example custom actions could include identifying the number of times that field devices in a custom group changed their health status between good and bad states, identifying details of personnel who performed maintenance operations on the field devices in a custom group, and identifying the number of man-hours of maintenance operations performed on the field devices in a custom group. Also note that while a pop-up window 308 is shown here as supporting the custom actions, custom actions could be triggered in any other suitable manner. Once selected, the custom action could then be performed for each field device 306 in the associated custom group 304a-304n or for a subset of field devices 306 in the associated custom group 304a-304n.

The custom groups 304a-304n shown in FIG. 3 can be created in any suitable manner. For example, a user could select the network view or device state view, select any suitable number of field devices, and trigger the creation of a custom group (such as by "right-clicking" on any selected field device or by selecting the appropriate command in a menu). The user could then be given options for naming the custom group, saving information about the custom group to a centralized database, or any other suitable function(s).

Although FIGS. 2 and 3 illustrate one example of a graphical user interface supporting customized viewing and control of field devices, various changes may be made to FIGS. 2 and 3. For example, the graphical user interface could support any number and types of views in the view selector 202. Also, the layout and arrangement of the graphical user interface in general and the device displays 204, 302 in particular are for illustration only. Field devices can be presented in any other suitable manner, as long as at least one view groups field devices into custom groups. Further, while described as representing "critical instruments," any suitable groups of field devices can be defined. In addition, while various input or output mechanisms (such as menus, trees, buttons, and pop-up windows) are shown and described above, any other or additional input or output mechanisms could be used to provide information to or receive information from a user.

FIGS. 4 through 8 illustrate example reports associated with custom groups of field devices according to this disclosure. The reports shown here could be generated in any suitable manner. For example, the reports could be selected using a pop-up window or menu item in the graphical display 200, such as a pop-up window 308 listing the possible custom actions that can be selected (including the generation of one or more reports). The reports could be selected in any other suitable manner, such as using another application that has access to the custom groups 304a-304n created using the graphical display 200.

Figure 4:
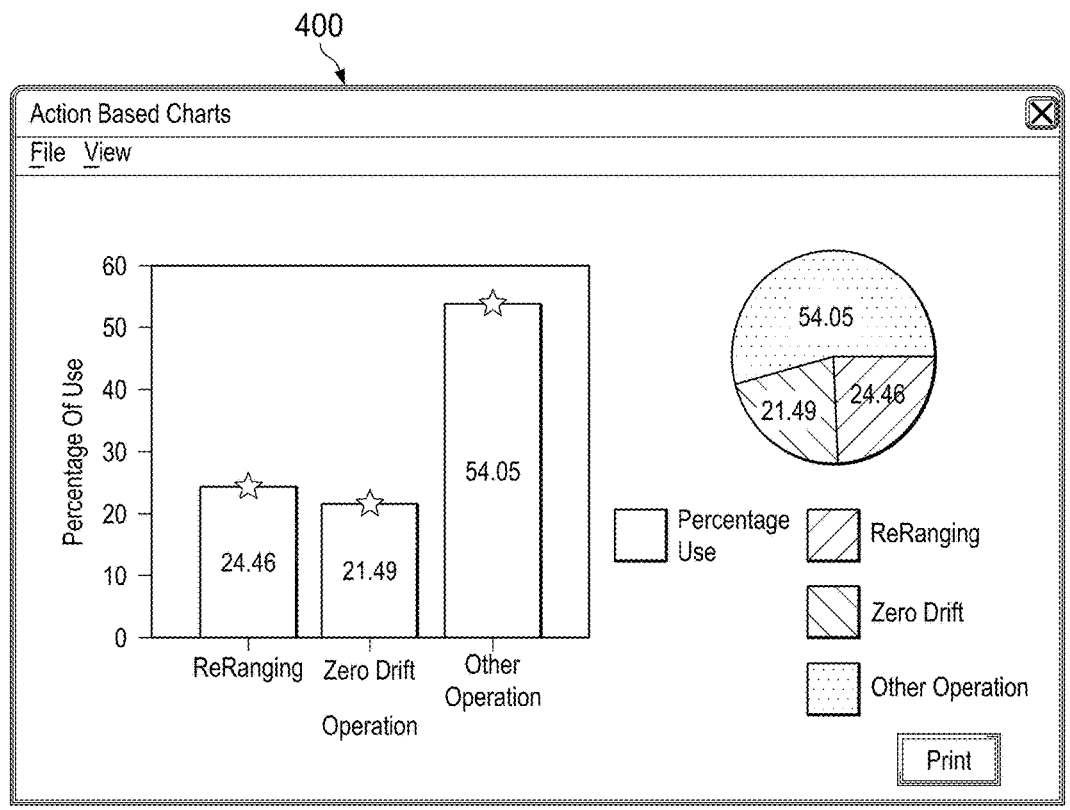
FIGS. 4 through 8 illustrate example reports associated with custom groups of field devices according to this disclosure.

In FIG. 4, a report 400 identifies different types of maintenance operations performed on the field devices in a custom group over time. In this example, the different types of maintenance operations are divided into re-ranging maintenance operations, zero drift maintenance operations, and other maintenance operations. This report 400 allows personnel to easily identify the maintenance requirements for the custom group of field devices over a given time period.

Figure 5:
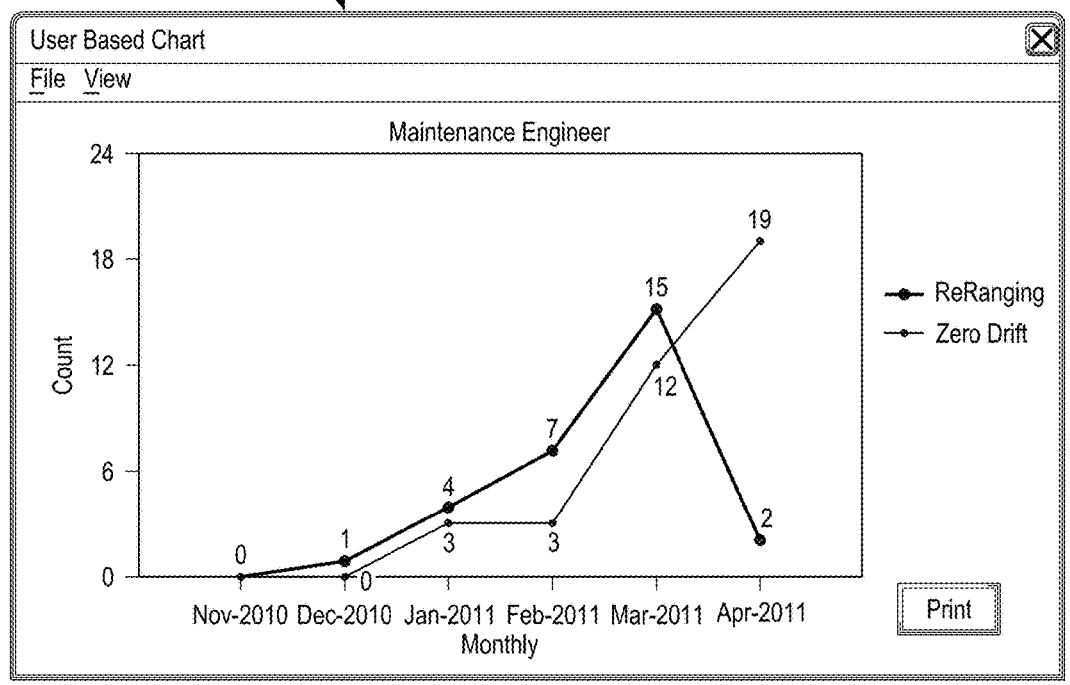

In FIG. 5, a report 500 identifies different types of maintenance operations performed by a specific individual or type of individual on the field devices in a custom group over time. In this example, the different types of maintenance operations again include re-ranging maintenance operations and zero drift maintenance operations. This report 500 allows personnel to easily identify the maintenance functions performed by specific personnel or types of personnel for the custom group of field devices over a given time period.

Figure 6:
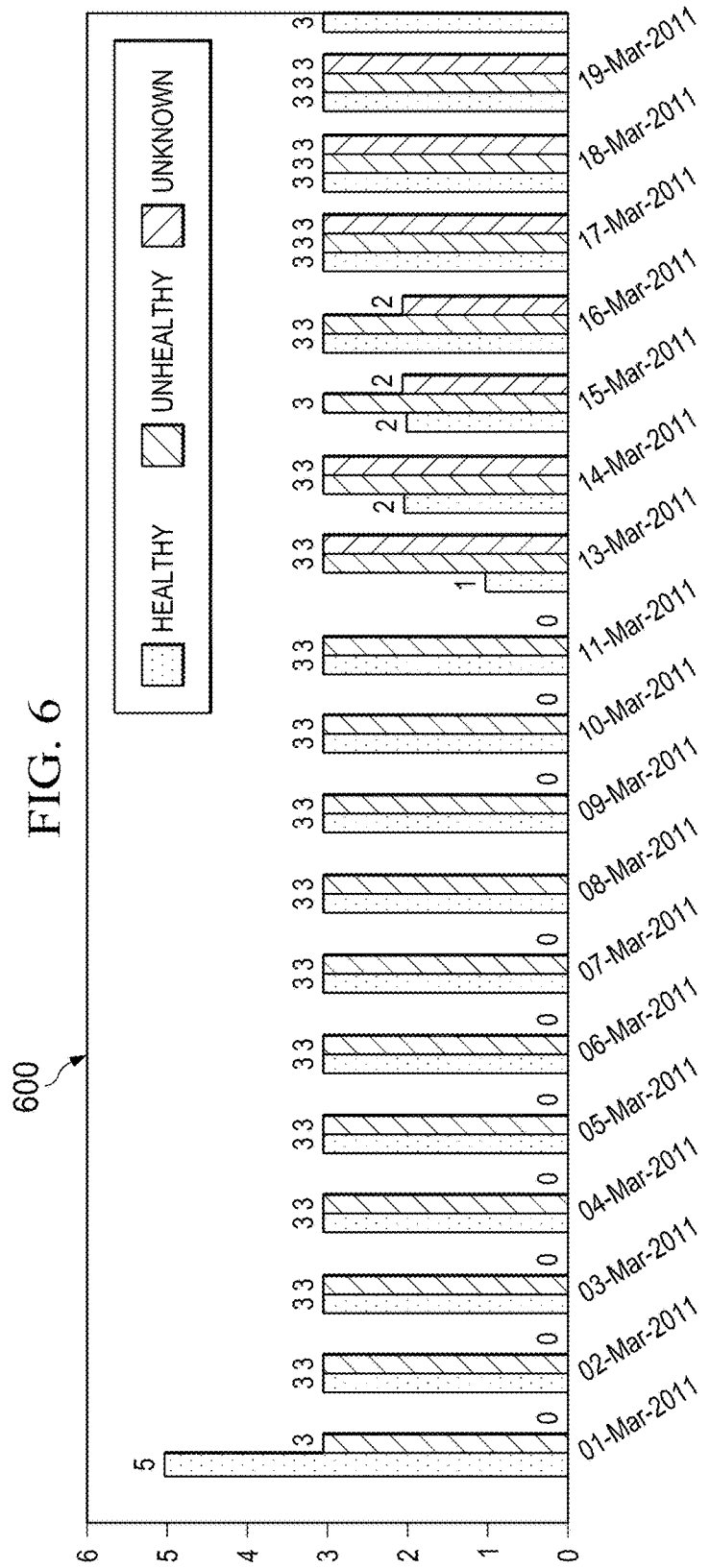
Figure 7:
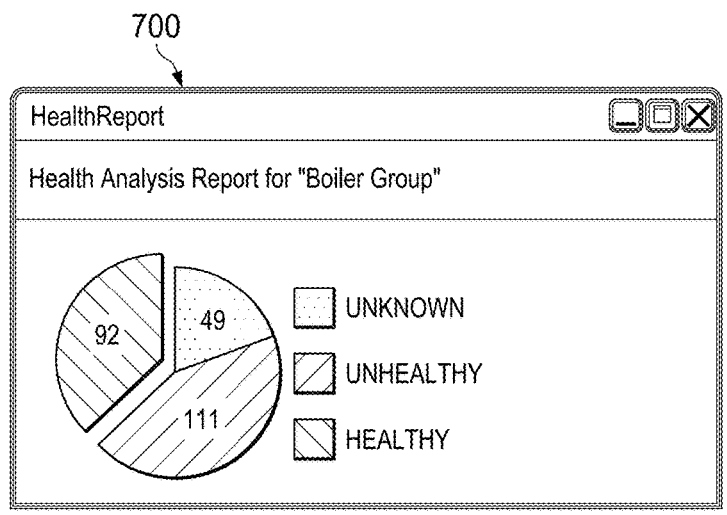

In FIGS. 6 and 7, reports 600 and 700 are health reports identifying the operational health of field devices in a custom group. The report 600 in FIG. 6 identifies the number of field devices in a custom group that had healthy, unhealthy, and unknown states over time using a bar graph. The report 700 in FIG. 7 uses a pie chart to identify the current or historical number of field devices in a custom group that have or had healthy, unhealthy, and unknown states.

Figure 8:
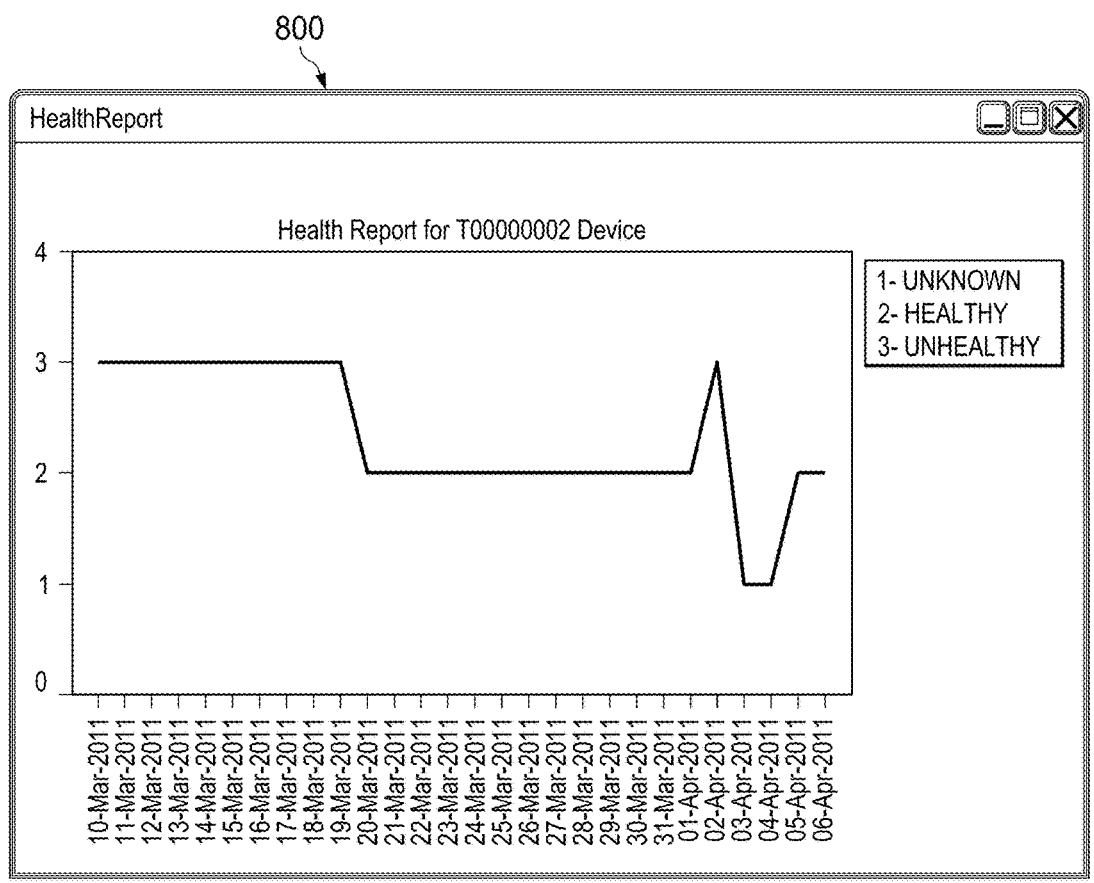

In FIG. 8, a report 800 identifies the health status of an individual field device over time. This report 800 could be generated for each field device in a custom group or for an individual field device.

As can be seen here, a wide variety of reports can be generated for field devices. The reports can be extensive reports based on various criteria, such as for specific maintenance personnel, device types, or health statuses. Reports can represent a current snapshot of an industrial system or historical views over periods of time. The wealth of information available via these or other reports can allow plant managers to engage in effective decision-making and planning for maintenance operations and to support effectiveness, labor utilization, and instrument health analyses.

Although FIGS. 4 through 8 illustrate examples of reports 400-800 associated with custom groups of field devices, various changes may be made to FIGS. 4 through 8. For example, the content and arrangement of the reports 400-800 are for illustration only and can be modified as desired. Also, various other or additional reports can be generated for one or more field devices associated with one or more custom groups.

It can be seen above that the grouping of field devices into custom groups by users can act as a framework for providing a wide variety of additional functionalities. Those additional functionalities include the application of actions (including custom actions) to field devices in the groups and the generation of reports for field devices in the groups. However, this framework could be used to support any of a wide variety of additional operations that rely on or use groups of field devices.

Figure 9:
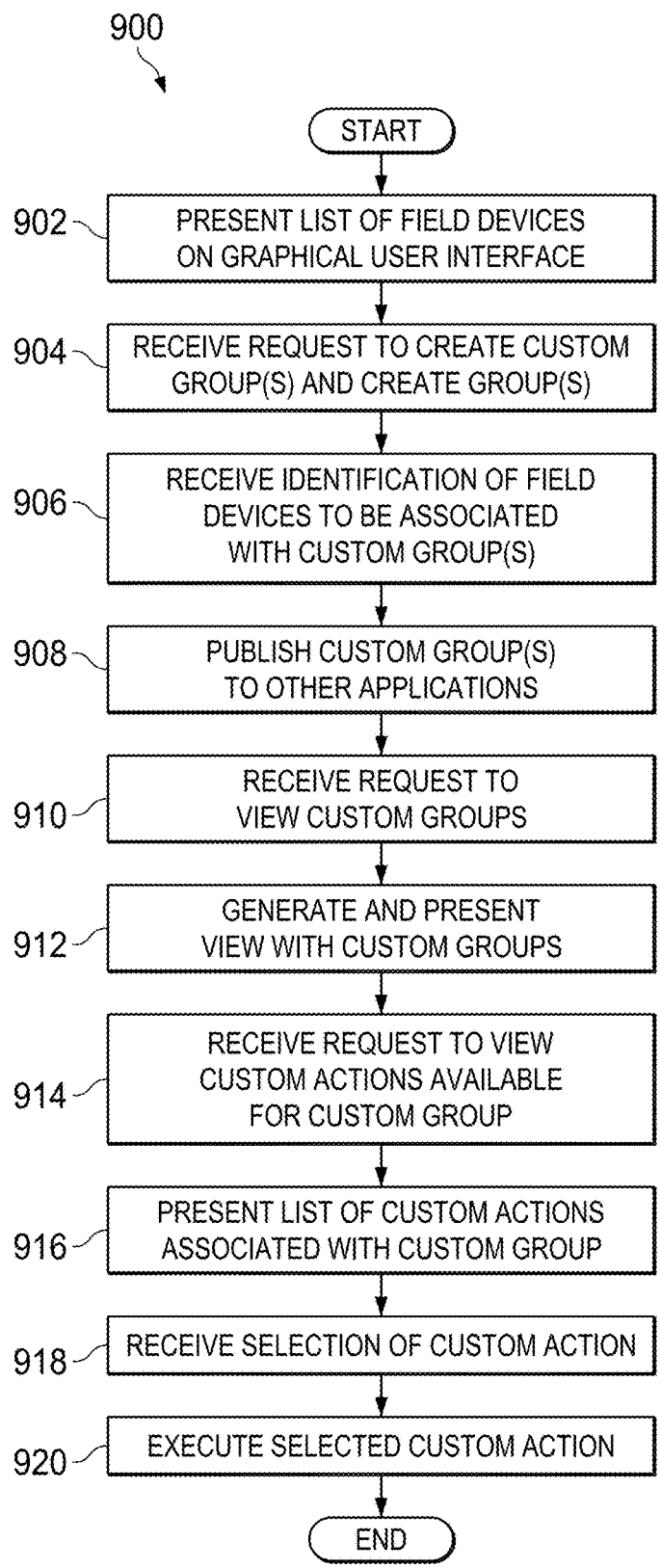
FIG. 9 illustrates an example method for customized viewing and control of field devices through custom groups and actions according to this disclosure.

FIG. 9 illustrates an example method 900 for customized viewing and control of field devices through custom groups and actions according to this disclosure. In the following description, the method 900 is described as being performed by an operator station, such as the operator stations 102a-

102m. Note, however, that the method 900 could be performed partially or completely by one or more other devices, such as the server 114.

As shown in FIG. 9, a list of field devices is presented on a graphical user interface to a user at step 902. This could include, for example, an operator station displaying a list of field devices in a network hierarchy view, a plant segregation view, or other view. The listed field devices could include sensors, actuators, relays, process controllers, I/O modules, or any other devices.

At least one request to create at least one custom group is received and the at least one custom group is created at step 904. This could include, for example, an operator station receiving a request from a user to create a custom group of field devices using a menu system or in any other suitable manner. Related details about the group(s) could also be received, such as a name for each custom group and optionally an indication whether each custom group is to be saved to a centralized database for use by other machines or users.

An identification of the field devices to be associated with the custom group(s) is received at step 906. This could include, for example, an operator station receiving from a user a selection of the field devices to be associated with each custom group. As a particular example, the user could select field devices from the network hierarchy or plant segregation view, choose an option to add the selected field devices to a custom group, and select the custom group from a list of groups. Optionally, once a field device is associated with one custom group, a tag or other attribute of the field device can be changed to indicate that the field device is assigned to a custom group. This attribute can be used to inform a user that a field device belongs to a group or to automatically prevent the field device from being grouped more than once. This may be desired, for instance, to avoid the same field device from being assigned to different custom groups with conflicting custom action sets. However, in other embodiments, a field device may be placed into more than one custom group.

The one or more custom groups are published to other applications at step 908. This could include, for example, one application on the operator station (such as the application being used to create the custom group) providing details of the custom group to another application on the same operator station. This could also include the operator station publishing data associated with the custom group to a centralized database 112 or other repository for use by other operator stations.

A request to view custom groups is received at step 910. This could include, for example, a user at an operator station requesting to view all "critical instruments" groups. The operator station here may be the same operator station on which a custom group is defined or a different operator station. A view with the custom groups is generated and presented at step 912. This could include, for example, the operator station generating a view as shown in the device display 302. The view with the custom groups could include a status of each field device in one or more custom groups.

A request to view custom actions available for a custom group is received at step 914. This could include, for example, an operator station detecting that a user has right-clicked on a custom group in the device display 302. A list of custom actions associated with the custom group is presented at step 916. This could include, for example, the operator station displaying a pop-up window 308 identifying a list of possible custom actions. The custom actions could include default actions predefined by an application or user-defined actions. A selection of one of the actions is received at step 918, and the selected action is executed at step 920. This could include, for example, executing the selected custom action for all or a subset of the field devices associated with the custom group.

In this way, operators can easily create custom groups of field devices and use the custom groups to quickly and easily trigger custom actions for those field devices. This can greatly simplify the operators' tasks and provide simpler access to the field devices.

Although FIG. 9 illustrates one example of a method 900 for customized viewing and control of field devices through custom groups and actions, various changes may be made to FIG. 9. For example, while shown as a series of steps, various steps in FIG. 9 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating a graphical display associated with an industrial process control system having multiple field devices in an industrial facility, the graphical display including multiple custom groups of field devices including a first custom group and a second custom group, each of the custom groups comprising a subset of the field devices, wherein at least one of the custom groups identifies field devices selected based on a personnel work shift, wherein the field devices in each of the custom groups are selected based on a time of day that the field devices are critical, and wherein field devices in the first custom group are critical at a different time of day than field devices in the second custom group;

presenting the graphical display including the first and second custom groups;

receiving a request to perform an action associated with a specified one of the custom groups;

initiating performance of the action for at least some of the field devices in the specified custom group; and generating a report for the field devices in the custom groups identifying an operational health of the field devices over time.

2. The method of claim 1, further comprising:
defining the custom groups of field devices based on user input.

3. The method of claim 2, wherein:
defining the custom groups comprises defining the custom groups using a first application; and
the method further comprises publishing the custom groups to a second application for use by the second application.

4. The method of claim 1, wherein:
the action comprises a custom action; and
the method further comprises defining the custom action based on user input.

5. The method of claim 4, wherein defining the custom action comprises receiving user input defining one or more functions to be executed in order to implement the custom action.

6. The method of claim 1, wherein, for each of the custom groups, the graphical display identifies a status of each field device in the custom group.

7. The method of claim 6, wherein each of the custom groups identifies critical field devices associated with a different functional unit in the industrial facility.

8. The method of claim 1, wherein each of the custom groups identifies field devices further selected based on an industrial facility control loop.

9. The method of claim 1, wherein the action comprises capturing information associated with at least one of: maintenance activities related to the field devices and device alerts from the field devices.

10. The method of claim 1, further comprising:
generating a second report for the field devices in the custom groups identifying different types of maintenance operations performed on the field devices over time.

11. An apparatus comprising:
at least one memory configured to store an identification of multiple custom groups of field devices in an industrial process control system associated with an industrial facility, the custom groups including a first custom group and a second custom group, each of the custom groups comprising a subset of the field devices, wherein at least one of the custom groups identifies field devices selected based on a maintenance schedule, wherein the maintenance schedule includes a maintenance personnel performance schedule, wherein the field devices in each of the custom groups are selected based on a time of day that the field devices are critical, and wherein field devices in the first custom group are critical at a different time of day than field devices in the second custom group; and at least one processing device configured to:
generate a graphical display for presentation, the graphical display including the first and second custom groups of field devices;
receive a request to perform an action associated with a specified one of the custom groups;
initiate performance of the action for at least some of the field devices in the specified custom group; and
generate a report for the field devices in the custom groups identifying an operational health of the field devices over time.

12. The apparatus of claim 11, wherein:
the at least one processing device is further configured to define the custom groups of field devices based on user input; and
at least one of the custom groups includes field devices that have different hardware configurations.

13. The apparatus of claim 11, wherein:
the action comprises a custom action; and
the at least one processing device is further configured to define the custom action based on user input.

14. The apparatus of claim 11, wherein, for each of the custom groups, the graphical display identifies a status of each field device in the custom group.

15. The apparatus of claim 11, wherein the at least one processing device is further configured to generate a second report for the field devices in the custom groups identifying different types of maintenance operations performed on the field devices over time.

16. The apparatus of claim 11, wherein each of the custom groups identifies critical field devices associated with a different functional unit in the industrial facility.

17. The apparatus of claim 11, wherein the at least one processing device is configured to receive the request to perform the action by presenting a list of custom actions associated with the custom groups and receiving a selection of one of the custom actions from the list.

18. A non-transitory computer readable medium containing a computer program, the computer program comprising instructions that when executed cause at least one processing device to:
generate a graphical display associated with an industrial process control system having multiple field devices in an industrial facility, the graphical display including multiple custom groups of field devices including a first custom group and a second custom group, each of the custom groups comprising a subset of the field devices, wherein at least one of the custom groups identifies field devices selected based on a personnel work shift, wherein the field devices in each of the custom groups are selected based on a time of day that the field devices are critical, and wherein field devices in the first custom group are critical at a different time of day than field devices in the second custom group;
present the graphical display including the first and second custom groups;
receive a request to perform an action associated with a specified one of the custom groups;
initiate performance of the action for at least some of the field devices in the specified custom group; and generate a report for the field devices in the custom groups identifying an operational health of the field devices over time.

19. The computer readable medium of claim 18, wherein the computer program further comprises instructions that when executed cause the at least one processing device to:
define the custom groups of field devices based on user input; and
define the action based on user input.

20. The computer readable medium of claim 18, wherein, for each of the custom groups, the graphical display identifies a status of each field device in the custom group.

21. A method comprising:
generating a graphical display associated with an industrial process control system having multiple field devices in an industrial facility, the graphical display including multiple custom groups of field devices including a first custom group and a second custom group, each of the custom groups comprising a subset of the field devices, wherein at least one of the custom groups identifies field devices selected based on a maintenance schedule, wherein the maintenance schedule includes a maintenance personnel performance schedule, wherein the field devices in each of the custom groups are selected based on a time of day that the field devices are critical, and wherein field devices in the first custom group are critical at a different time of day than field devices in the second custom group;
presenting the graphical display including the first and second custom groups;
receiving a request to perform an action associated with a specified one of the custom groups;
initiating performance of the action for at least some of the field devices in the specified custom group; and
generating a report for the field devices in the custom groups identifying an operational health of the field devices over time.

22. An apparatus comprising:
at least one memory configured to store an identification of multiple custom groups of field devices in an industrial process control system associated with an industrial facility, the custom groups including a first custom group and a second custom group, each of the custom groups comprising a subset of the field devices, wherein at least one of the custom groups identifies field devices selected based on a personnel work shift, wherein the field devices in each of the custom groups are selected based on a time of day that the field devices are critical, and wherein field devices in the first custom group are critical at a different time of day than field devices in the second custom group; and
at least one processing device configured to:
generate a graphical display for presentation, the graphical display including the first and second custom groups of field devices;
receive a request to perform an action associated with a specified one of the custom groups;
initiate performance of the action for at least some of the field devices in the specified custom group; and
generate a report for the field devices in the custom groups identifying an operational health of the field devices over time.

23. A non-transitory computer readable medium containing a computer program, the computer program comprising instructions that when executed cause at least one processing device to:
generate a graphical display associated with an industrial process control system having multiple field devices in an industrial facility, the graphical display including multiple custom groups of field devices including a first custom group and a second custom group, each of the custom groups comprising a subset of the field devices, wherein at least one of the custom groups identifies field devices selected based on a maintenance schedule, wherein the maintenance schedule includes a maintenance personnel performance schedule, wherein the field devices in each of the custom groups are selected based on a time of day that the field devices are critical, and wherein field devices in the first custom group are critical at a different time of day than field devices in the second custom group;
present the graphical display including the first and second custom groups;
receive a request to perform an action associated with a specified one of the custom groups;
initiate performance of the action for at least some of the field devices in the specified custom group; and
generate a report for the field devices in the custom groups identifying an operational health of the field devices over time.

* * * * *